Dec. 15, 1970 R. A. SCHLUETER 3,548,360

TERMINAL STRIP

Filed Feb. 3, 1966

INVENTOR.
Robert A. Schlueter
BY
Cornelius J. O'Connor
Attorney 3,548,360
TERMINAL STRIP Robert A. Schlueter, Barlett, Ill., assignor to Zenith Radio Corporation, Chicago, Ill., a corporation of Delaware Filed Feb. 3, 1966, Ser. No. 524,922
Int. Cl. H01r 3/06, 5/04
U.S. Cl. 339—14 13 Claims

ABSTRACT OF THE DISCLOSURE

A chassis assembly for supporting electrical circuit elements includes a chassis member having a cut-out and one or more terminal strip mounting portions adjacent the cut-out. A terminal strip having a plurality of conductive insertion terminals, is mounted on the chassis with its terminals extending through the cut-out and with one or more insertion terminals engaging an assigned mounting portion to secure the terminal strip to the chassis. The mounting terminals serving to secure the terminal strip are also available for use in establishing electrical circuits.

This invention relates in general to electrical apparatus and in particular to an improved chassis assembly for establishing electrical connections in such apparatus, and to an improved method of assembling a radio or television chassis or the like.

In many types of electrical apparatus, such as radio and television receiver chassis, a multitude of terminal devices are employed to establish the requisite electrical circuits. Conventionally, these devices comprise terminal strips, tube sockets, etc., which are anchored to the chassis. Each such device carries a plurality of terminal lugs to which wires and component leads are attached and then secured as by soldering.

One type of terminal widely used in the connector art is the so-called insertion terminal. One construction for this type terminal contemplates an open-ended well or cup, the wall of which is pierced in such a fashion as to form a plurality of inwardly converging fingers which grasp an electrical lead inserted into the well. When the desired circuit connections have been established between the terminals and component leads, the connections are permanently bonded by applying a molten conductive solder to the terminals. These terminals can be manually soldered or they can be dipped into a vessel or reservoir of molten solder. In either case the solder flows through the wall apertures and into the cup to bond the electrical connections.

Insertion terminals are employed not only in strip form but are also used in tube sockets as well as other types of component supporting devices. It is unquestioned that insertion type terminals and dip soldering techniques provide reliable electrical connections and do achieve economies in the manufacture of electrical assemblies. However, the methods employed to secure these improved terminal devices to the chassis continue to follow conventional, and relatively expensive, prior art practices. Specifically, the practice has been to employ rivets, grommets or other type fasteners to secure the terminal strips, tube sockets and the like to the chassis. The use of such fasteners not only entails an additional time consuming assembly operation, but there is also the consideration that a machine or tool must be furnished to effect the fastening.

Moreover, in a situation where it is necessary to establish a plane of reference potential (ground) for the circuit, which is frequently the case, the chassis must be provided with a separate lug or terminal to accommodate the grounding lead or conductor.

It is therefore an object of the invention to provide an improved chassis assembly for electrical apparatus.

It is a further object of the invention to provide an improved chassis assembly employing an electrical terminal device without the use of conventional fasteners.

It is another object of the invention to provide a chassis assembly comprising a terminal device which automatically establishes an electrical grounding station for the chassis circuitry when it is affixed to the chassis.

It is also another object of the invention to provide an electrical chassis having a terminal device which permits substantial economies to be realized in the chassis assembly.

It is still another object of the invention to provide an improved method of assembling an electrical chassis.

An improved chassis assembly for supporting a plurality of electrical circuit components and constructed in accordance with the invention comprises a chassis member having a cut-out of predetermined configuration and a terminal device comprising a base of insulating material and a plurality of insertion terminals. These terminals are separately affixed to the base and each is adapted to receive wire and lead elements for establishing electrical connections to the circuit components. The terminal device is juxtaposed with the chassis member so that the base of the terminal device confronts one surface of the chassis member. The insertion terminals are so arrayed that when the terminal device is positioned on the chassis member, the terminal array is encompassed by the cut-out and extends therethrough. Finally, means, consisting essentially of one or more additional similar terminals extending through the chassis member and anchored thereto, are provided for securing the terminal device to the chassis member. It is also a feature of the invention that the aforementioned one or more additional terminals are also available for use in establishing electrical circuit connections.

In accordance with another aspect of the invention a method of assembling the improved electrical chassis is also taught. The method contemplates providing a chassis member with a cut-out having a configuration capable of encompassing a predetermined array of insertion terminals and also providing the chassis member with a deformation adjacent the cut-out. The base of the terminal device is positioned upon the chassis member with the base confronting one surface of the chassis and with the terminal array extending through the cut-out. Engagement between at least one of the terminals and the chassis deformation is then effected to secure the terminal device to the chassis member. Electrically conductive leads from the circuit components are then inserted into selected ones of the insertion terminals to establish electrical connections to the components. On the other hand, if it is so desired, the circuit components can be inserted into the terminals before the terminal device is positioned upon the chassis member. Finally, molten solder is applied to the insertion terminals to bond the electrical connections and to mechanically secure the terminal engaged with the chassis deformation to the chassis member.

The features of this invention which are believed to be novel are set forth with particularity in the appended claims. The invention, together with further objects and advantages thereof, may best be understood, however, by reference to the following description taken in conjunction with the accompanying drawings, in the several figures of which like reference numerals identify like elements, and in which:

Figures 1, 2, 2A, 3, 4:
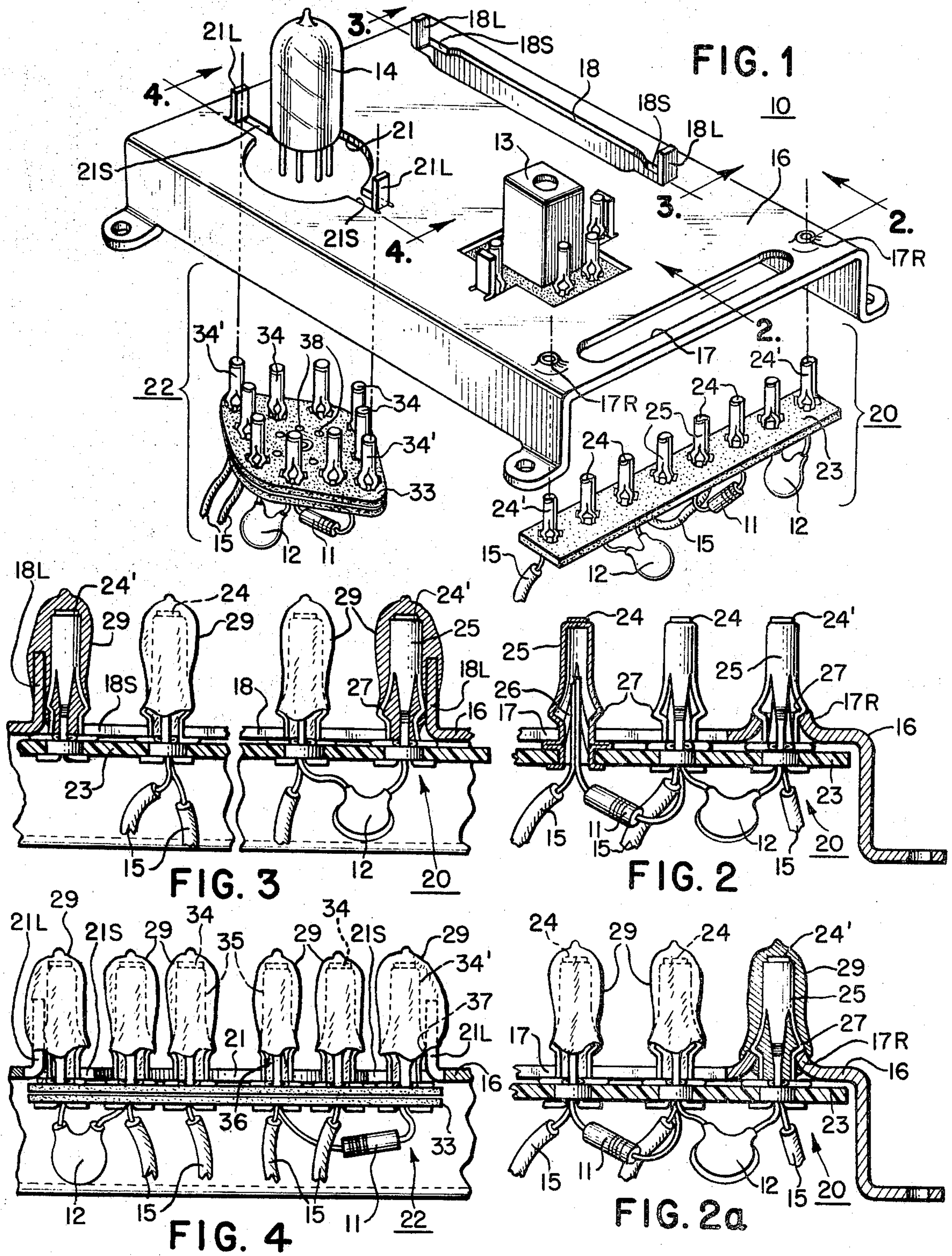
FIG. 1 is a partially exploded perspective view of a chassis assembly embodying the invention.
FIG. 2 is a fragmentary sectional view of a partially assembled portion of the chassis taken along line 2—2 in FIG. 1.

FIG. 2*a* shows the chassis portion of FIG. 2 as modified by a subsequent assembly step;

FIG. 3 is a fragmentary sectional view of an assembled portion of the chassis taken along line 3—3 of FIG. 1; and FIG. 4 is a fragmentary sectional view of a different assembled portion of the chassis taken along line 4—4 of FIG. 1.

FIG. 1 is an exploded view of an abbreviated version of a chassis assembly 10 of the type commonly employed in radio and television receivers. Chassis 10 supports a plurality of electrical components such as resistors 11, capacitors 12, an IF transformer 13 and a vacuum tube 14 for which, of course, a transistor device can be employed. Additionally, assembly 10 includes a number of conductive leads 15. Assembly 10 further comprises a chassis member or base plate 16 preferably constructed of a conductive material such as sheet steel; however, a non-conductive material to which solder, or other similar bonding agent, will adhere is also suitable. Base plate 16, in turn, is provided with a variety of cut-outs for receiving different types of terminal devices.

More particularly, the cut-outs 17 and 18 in base plate 16 have predetermined configurations for receiving an elongated terminal strip of the type identified by reference numeral 20 while the cut-out 21 has a configuration suited to accommodate a tube socket 22. In order to avoid unduly cluttering FIG. 1, neither the cut-out nor the terminal device for mounting IF transformer 13 is detailed, since, except for their specifically different layout, they are simply adaptations of cut-out 21 and terminal socket 22.

Referring again to the cut-outs, in each instance the size and configuration of the cut-out is such as to encompass an array of terminals presented by the terminal device mounted therein. Where base plate 16 is formed of a conductive material it is necessary that sufficient clearance be provided between the terminal array and the walls of the cut-out. On the other hand, if base plate 16 is constructed of a non-conductive material the degree of clearance is less important.

As best seen in FIG. 1, those portions of base plate 16 adjacent the extremities of cut-out 17, are deformed to provide means for securing a terminal device of the type previously identified by reference numeral 20 to the base plate. More particularly, cut-out 17 is terminated by a pair of upset rings 17R which are extruded upwardly from the base plate.

Terminal device 20 comprises a base 23 of insulating material having overall dimensions greater than cut-out 17 and a plurality of insertion type terminals 24 separately affixed to the base and adapted to receive the lead elements of electrical components 11, 12 and the prepared ends of conductive wires 15. A pair of additional end terminals of strip 20 are identified by reference numeral 24′ and are employed to secure the strip to base plate 16 and to establish electrical circuit connections, for example, to a plane of reference potential (ground), all in a manner to be described.

Each of terminals 24, 24′ comprises an open-ended well 25 that encloses a series of fingers 26 which are struck from the wall of the well and converged inwardly, see FIG. 2. In addition to fingers 26, each of the terminal wells includes a deformable or compressible mounting shoulder 27 which can be formed, for example, by bowing out those wall portions of the well intermediate fingers 26.

While it is appreciated that terminals 24 do not require mounting shoulders 27, economic considerations suggest that all the insertion terminals be of identical configuration. An obvious advantage of such an arrangement resides in the fact that, an elongated terminal strip comprised of shouldered terminals can be subdivided into any number of shorter terminal strips, and a pair of mounting terminals is always available. Additionally, it may be desirable to support the terminal device at one or more points intermediate its extremities, and/or to provide a ground connection at such points.

As shown in FIG. 2, terminal strip 20 is juxtaposed with chassis base plate 16 so that the base 23 of the strip confronts the undersurface of base plate 16 and with terminals 24 disposed in an array that extends through and is encompassed by cut-out 17.

More particularly, terminal strip 20 is fitted to cut-out 17 of base plate 16, by inserting end terminals 24′ into upset rings 17R. The strip is then urged against the underside of the base plate until the shoulders 27 encounter the walls of rings 17R. Depending upon the height of rings 17R which, in turn, is determined by the thickness of the base plate from which they are extruded, the shoulder portion of terminal 24 may snap over the rim of the ring, as shown in FIG. 2, or, if the ring has a higher elevation than the shoulders, the terminal board can be secured by the compressive force established between the ring and the shoulders. In any event, terminal strip 20 is initially secured to base plate 16 by a cooperation between a deformation of the base plate, in this instance upset rings 17R, and the shoulder portion of the terminal. In addition to their function of securing terminal strip 20 to base plate 16, it is clear from a study of FIG. 2 that terminals 24′ are also available for use in forming electrical ground connections by insertion of lead wires in exactly the same fashion as other connections are made to any of terminals 24. In a chassis assembly in which the base plate is constructed of a non-conductive material, terminals 24′ are available for use in establishing any desired circuit connections.

After strip 20 has been secured to base plate 16, the lead elements of components 11 and 12 and the ends of wire leads 15 are inserted into the open ends of the wells of assigned ones of terminals 24, 24′ and retained therein by the gripping force exerted by fingers 26, see FIG. 2. If desired, terminal strip 20 can be prepared as a subassembly by inserting the components and wire leads into the terminals before the terminal strip is mounted on base plate 16. In any event, after the strip is mounted on the base plate, the established circuit connections are permanently bonded by applications of solder 29, see FIG. 2*a*. The solder may be applied by a manual operation or, preferably, by dipping the terminals into a vessel of molten solder. In the latter method it may be desirable to compartmentalize the vessel containing the molten solder in order to provide a separate chamber for receiving mounting terminals 24′. Such a chamber should preferably have a higher level of solder than the rest of the vessel in order to deposit solder across the junction formed by upset rings 17R and shoulders 27 of terminals 24′. At any rate, and irrespective of the soldering method employed, the lead elements of the circuit components are permanently bonded in terminals 24, 24′ and terminals 24′ are mechanically, as well as electrically, connected to base plate 16.

Terminals 24′ are thus seen to not only mechanically affix terminal strip 20 to the base plate but also serve to establish an electrical connection to ground when the base plate is employed as a plane of reference potential. By resorting to the preferred dip soldering process, the soldering of terminals 24, 24′ and the bonding of terminal 24′ to the base plate can be achieved in one operation.

Attention is again directed to FIG. 1, as well as to FIG. 3, specifically to cut-out 18 which is illustrative of another arrangement by which terminal strip 20 can be secured to base plate 16. More particularly, cut-out 18 is terminated by a pair of lugs 18L and a pair of slots 18S, the latter being formed in the base plate when the lugs are struck therefrom. In this arrangement the dimensions of slots 18S are selected to have a width which is less than the girth of shoulder portion 27 of the terminals while the spacing between lugs 18L is slightly less than the span from the outside shoulder portion of the one mounting terminal to that of the other. The lugs themselves preferably have an upright dimension of sufficient length to penetrate the surface of the molten solder contained in the dip soldering vessel.

In this construction, terminal strip 20 is initially secured to base plate 16 by a snap fit when mounting terminals 24′ are inserted into slots 18S with additional support being provided by the compressive force exerted by lugs 18L against the confronting shoulder portions of the mounting terminals. In this fashion terminal strip 20 is temporarily secured within cut-out 18 with its terminal array extending through and encompassed by the cut-out.

Circuit components 11, 12 and conductive leads 15 are inserted into terminals 24, 24′ to establish desired electrical circuit connections, which connections are bonded in the same manner as that described in the previous discussion, that is, by applications of solder 29 either manually or by dip soldering. Here again, it is immaterial whether the component leads are inserted in the terminals before or after the strip is mounted in cut-out 18. It should also be noted that, as exemplified by the terminal 24′ at the extreme left hand side of strip 20 in FIG. 3, a mounting terminal can be employed solely for the purpose of anchoring the strip to the base plate. In the case of cut-out 18, if a dip soldering technique is resorted to, a dip soldering vessel having one compartment for all the terminals of the strip is suitable since lugs 18L have a sufficient length to penetrate the surface of the molten solder when the terminals are immersed therein. As shown in FIG. 3, lugs 18L provide an exceptionally solid electrical and mechanical bond between mounting terminals 24′ and the chassis base plate. Accordingly, it is seen that a terminal strip mounting arrangement comprising a cut-out terminated by the described slot and lug construction is particularly suited to dip soldering methods.

FIG. 4 shows the tube socket terminal device 22 of FIG. 1 affixed to base plate 16. Socket 22 comprises a wafer type base 33 of insulating material which supports a circular array of insertion type terminals 34, an inner array of sockets 38 which are individually connected to assigned ones of terminals 34 and a pair of additional mounting terminals 34′. Sockets 38, of course, receive the pins extending from tube 14, which arrangement is clearly evident from FIG. 1. In order to simplify the presentation, terminals 34, 34′ are disclosed as having the same construction as strip terminals 24, 24′, that is, they have wells 35, fingers 36 and mounting shoulders 37.

Socket 22 is initially secured in cut-out 21 in the same fashion as terminal strip 20 is mounted in cut-out 18, that is, by inserting mounting terminals 34′ in slots 21S and then pressing the socket against base plate 16 until shoulders 37 of the mounting terminals snap over the edges of the slots and bear against lugs 21L. Thereafter, the leads from the circuit components are inserted into the wells 35 of terminals 34, 34′ and, as already noted, whether the component leads are inserted before or after the terminal is fitted to the cut-out is of no consequence. Solder is then applied in the same fashion as that described above for bonding and anchoring terminal strip 20 in cut-out 18.

Another feature of the invention resides in a method of assembling chassis 10. First, base plate 16 is provided with one or more cut-outs having configurations capable of encompassing predetermined arrays of terminals. Such cut-outs can assume the configurations identified by reference numerals 17, 18 and 21. Chassis 16 is also provided with deformations such as upset rings or lugs and slots adjacent the cut-out. Upset rings 17R, for example, can be formed by a simple extrusion operation on the base plate. By the same token, the lug and slot arrangement is amenable to a single punching operation since shearing the lug from the base plate provides the slot. In both instances, the deformations can be provided at little or no added expense by suitable provisions in the die employed in the original chassis stamping operation.

Since terminal strip 20 is representative of the terminal devices herein considered, subsequent steps in the proposed method will specifically relate to such a terminal device. Accordingly, strip 20 is mounted upon base plate 16 by positioning the base 23 of the strip against and confronting one surface of base plate 16 so that the array of terminals 24 extend through the cut-out. Engagement is then effected between at least one of mounting terminals 24′ and the chassis deformation adjacent the cut-out; upset ring 17R in the case of cut-out 17 or the lug and slot arrangement 18L, 18S terminating cut-out 18. This engagement secures base 23 of strip 20 to the chassis for the following steps. Conductive leads from the circuit components are inserted in selected ones of insertion terminals 24, 24′ to establish electrical connections to the components. It should be emphasized again, that, insofar as practicing the invention is concerned, the component leads may be inserted in terminals 24, 24′ either before or after the terminal strip is mounted on the chassis.

In any event, when the terminal strip is secured to the chassis and the component leads have been inserted in their assigned terminals, molten solder is applied to terminals 24, 24′ to bond the electrical connections established by the terminals and to mechanically and electrically connect the mounting terminals to the chassis deformations adjacent the cut-out receiving strip. As already noted above, while the molten solder may be applied manually a dip soldering process is preferred.

In summary an improved chassis assembly 10 for supporting electrical components is disclosed in which a base plate 16 is provided with cut-outs of which 17 and 18 can be considered representative. A terminal strip 20 having a base of insulating material supports a plurality of insertion terminals 24, 24′ which receive the leads of the components to establish a desired pattern of electrical connections. The base plate is further provided with deformations adjacent the cut-outs to receive mounting terminals 24′ thereby initially securing the strip within the cut-out and with an array of terminals extending therethrough. The electrical connections are bonded and the mounting terminals are electrically and mechanically connected to the base plate by applications of solder. While a particular type of insertion terminal has been disclosed, it is appreciated that insertion terminals of another construction can be employed in practicing the invention. The approved chassis assembly finds particular utility in electrical apparatus in which the chassis serves as a plane of reference potential since the terminals employed to mechanically secure the terminal strip to the chassis can also provide a grounding connection for the electrical circuits. In conclusion a method of assembling this improved electrical chassis is also taught.

While particular embodiments of the present invention have been shown and described, it is apparent that changes and modifications may be made therein without departing from the invention in its broader aspects. The aim of the appended claims, therefore, is to cover all such changes and modifications as fall within the true spirit and scope of the invention.

What is claimed is:

1. A chassis assembly for supporting a plurality of electrical circuit components comprising:

a chassis member having a cut-out of predetermined configuration and one or more mounting portions disposed adjacent said cut-out;

a terminal device comprising a base of insulating material and a plurality of electrically conductive insertion terminals separately affixed to said base and each adapted to receive wire and lead elements for establishing electrical connections to said components, said terminal device being juxtaposed with said chassis member with said base confronting one surface of said chassis member and with said terminals disposed in an array encompassed by said cut-out and each extending through said cut-out;

means, consisting essentially of one or more additional insertion terminals individually engaging an assigned one of said mounting portions in said chassis member for initially securing said terminal device to said chassis member, said additional one or more terminals being also available for use in establishing electrical circuit connections;

and means for permanently bonding said one or more additional terminals to said chassis member.

2. A chassis assembly as defined in claim 1, in which said chassis member comprises an electrically conductive material and in which said chassis cut-out is sufficiently large to provide clearance for said terminal array.

3. A chassis assembly as defined in claim 2, in which all said terminals are of substantially identical construction and at least one of said additional one or more terminals for securing said terminal device to said chassis member further establishes an electrical grounding station.

4. A chassis assembly as defined in claim 1, in which said additional one or more terminals each comprises a mounting shoulder engageable with said chassis member.

5. A chassis assembly as defined in claim 2, in which said chassis member comprises one or more deformations adjacent said cut-out for engaging said additional one or more additional terminals.

6. A chassis assembly as defined in claim 2, in which said chassis mounting portions comprises one or more upset lugs integrally formed in said chassis member adjacent said cut-out, and said bonding means comprises solder connections between said additional one or more terminals and said one or more upset lugs.

7. A chassis assembly as defined in claim 5, in which said means for bonding said additional one or more terminals to said chassis deformations includes an application of solder.

8. A method of assembling an electrical chassis comprising a chassis member, a plurality of electrical circuit components and a terminal device having a base and a plurality of insertion terminals affixed thereto, assigned ones of said terminals being disposed in an array of predetermined configuration, said method comprising the following steps:

providing said chassis member with a cut-out having a configuration capable of encompassing said predetermined terminal array and with a mounting portion deformation adjacent said cut-out;

positioning said base of said terminal device upon said chassis member with said base confronting one surface of said chassis member and with said terminal array extending through said cut-out;

effecting engagement betwen at least one of said terminals and said deformation of said chassis member;

inserting electrically conductive leads from said components into selected ones of said insertion terminals to establish electrical connections to said components;

and applying molten solder to said insertion terminals to bond said electrical connections and to mechanically secure said one of said terminals to said deformation of said chassis member.

9. A method of assembling an electrical chassis as set forth in claim 8, in which the molten solder is applied simultaneously to all of said insertion terminals.

10. A method of assembling an electrical chassis as set forth in claim 8, in which the molten solder is applied to said insertion terminals by immersing said terminals in a vessel of molten solder.

11. A method of assembling an electrical chassis as set forth in claim 8, in which said conductive leads are inserted in said insertion terminals before said terminal device is secured to said chassis member.

12. A mounting arrangement for semipermanently affixing a solder well terminal connector to a chassis element or the like, comprising:

means formed out of said chassis element so as to leave an opening of predetermined transverse dimension in the element, a solder well terminal connector extending through said opening, said solder well terminal connector comprising an elongated hollow body, said hollow body having a side wall, a closed bottom, and an open top, a plurality of wire lead gripping fingers formed inwardly from said wall in radially spaced relationship around said wall, the forming of said wire lead gripping fingers leaving cutouts in said wall separated by wall segments extending longitudinally of said body, at least one of said wall segments being formed outwardly of the normal transverse dimensions of said body, whereby said at least one segment is compressed when the connector is pressed through said opening, expansion of said at least one segment after passage substantially through said opening serving to temporarily retain the connector in said opening, and solder means semipermanently holding said at least one segment expanded to prevent removal of the connector from said opening.

13. The mounting arrangement of claim 12 further characterized in that extension means comprises a bead around said opening, said at least one wall segment expanding under said bead.

References Cited

UNITED STATES PATENTS

| | | | |
|---|---|---|---|
| 2,191,871 | 2/1940 | Sutler | 339—134 |
| 2,352,126 | 6/1944 | Schmitt | 339—131 |
| 2,502,291 | 3/1950 | Taylor | 339—275B |
| 2,825,036 | 2/1958 | Sorensen | 339—275B |
| 2,884,612 | 4/1959 | Bang | 339—275B |
| 2,960,676 | 11/1960 | Shulters | 339—131 |
| 3,155,447 | 11/1964 | Haerther et al. | 339—275B |
| 3,156,517 | 11/1964 | Maximoff et al. | 339—275B |
| 3,355,701 | 11/1967 | Biba | 339—126 |

MARVIN A. CHAMPION, Primary Examiner

L. J. STAAB, Assistant Examiner

U.S. Cl. X.R.

339—126, 258, 275